(12) United States Patent
Davies

(10) Patent No.: US 9,067,544 B2
(45) Date of Patent: Jun. 30, 2015

(54) VEHICLE INTERIOR COMPONENT WITH STITCHING

(71) Applicant: Gordon H Davies, Birmingham, MI (US)

(72) Inventor: Gordon H Davies, Birmingham, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 13/866,300

(22) Filed: Apr. 19, 2013

(65) Prior Publication Data

US 2014/0312641 A1  Oct. 23, 2014

(51) Int. Cl.
*B60R 13/02* (2006.01)
*D05B 1/08* (2006.01)

(52) U.S. Cl.
CPC .. *B60R 13/02* (2013.01); *D05B 1/08* (2013.01)

(58) Field of Classification Search
CPC ............... B60R 13/0262; B60R 13/06; B29L 2031/3041; B29L 2031/3008
USPC ................... 296/1.08, 70, 146.7, 1.04, 146.1, 296/193.07; 156/93; 428/102
See application file for complete search history.

(56) References Cited

U.S. PATENT DOCUMENTS

| 7,052,566 | B2 | 5/2006 | Wright et al. | |
|---|---|---|---|---|
| 8,071,002 | B2 | 12/2011 | Boyer | |
| 2010/0171333 | A1* | 7/2010 | Smith et al. | 296/1.08 |
| 2010/0279051 | A1 | 11/2010 | Pokorzynski et al. | |

* cited by examiner

*Primary Examiner* — Joseph D Pape
*Assistant Examiner* — Dana Ivey
(74) *Attorney, Agent, or Firm* — Ralph E Smith

(57) ABSTRACT

A component for an interior of a vehicle may include inner, outer and intermediate layers, a support strip and a first thread. The outer layer may cover the inner layer. The intermediate layer may be disposed between the inner and outer layers and may be formed from a resiliently compressible material. The support strip may be at least partially received in a recess in the intermediate layer and may include an inward-facing surface and an outward-facing surface. The outward facing surface may be adjacent an inward-facing surface of the outer layer. The first thread may be stitched through the outer layer, the support strip, and the intermediate layer.

19 Claims, 2 Drawing Sheets

VEHICLE INTERIOR COMPONENT WITH STITCHING

FIELD

The present disclosure relates to an interior component of a vehicle having stitching.

BACKGROUND

Modern vehicles include interior components, such as instrument panels, for example, that are designed and manufactured to achieve a desired aesthetic appeal. Certain features of these components may be included to provide a luxurious look for the interior of the vehicle and/or increase a vehicle occupant's perception of quality of the vehicle. For example, decorative stitching may be provided on instrument panels, dashboards, seats, armrests, headrests, headliners, and/or interior door panels.

SUMMARY

The present disclosure provides a component for an interior of a vehicle that may include inner, outer and intermediate layers, a support strip and a first thread. The outer layer may cover the inner layer. The intermediate layer may be disposed between the inner and outer layers and may be formed from a resiliently compressible material. The support strip may be at least partially received in a recess in the intermediate layer and may include an inward-facing surface and an outward-facing surface. The outward facing surface may be adjacent an inward-facing surface of the outer layer. The first thread may be stitched through the outer layer, the support strip, and the intermediate layer.

In some embodiments, the component may include a second thread stitched through the outer layer, the support strip, and the intermediate layer. The first and second threads may form first and second series of stitches, respectively, that extend substantially parallel to each other.

In some embodiments, either or both of the first and second threads may be stitched through the inner layer.

In some embodiments, the support strip may include opposing lateral surfaces extending between the inward-facing and outward-facing surfaces of the support strip. The lateral surfaces may be engaged with corresponding surfaces of the recess.

In some embodiments, the intermediate layer may be molded around the support strip.

In some embodiments, the outward-facing surface of the support strip may directly contact and support a portion of the inward-facing surface of the outer layer.

In some embodiments, a portion of the intermediate layer may directly contact the inward-facing surface of the outer layer.

In some embodiments, an outward-facing surface of the intermediate layer may be substantially flush with the outward-facing surface of the support strip.

In some embodiments, the support strip may be disposed beneath a seam in the outer layer. In some embodiments, the support strip may be approximately centered beneath the seam.

In some embodiments, the seam may include a faux seam or a real seam.

In some embodiments, the inner, outer and intermediate layers may define an opening through which interior accessories of the vehicle are received. In some embodiments, the interior accessories may include a gauge. In some embodiments, inner, outer and intermediate layers may form an instrument panel.

In another form, the present disclosure provides a method of manufacturing an interior component of a vehicle. The method may include forming a base layer, forming a resiliently compressible layer over the base layer and providing an outer skin layer over the compressible layer and the base layer. The outer skin layer may be visible by an occupant of the vehicle when the interior component is installed in the vehicle. A support strip may be provided between the outer skin layer and the compressible layer. A thread may be stitched through the outer skin layer, the support strip, and the compressible layer.

In some embodiments, providing the support strip between the outer skin layer and the compressible layer may include providing an inward-facing surface of the support strip between an outward-facing surface of the compressible layer and the base layer.

In some embodiments, providing the support strip between the outer skin layer and the compressible layer may include providing an outward-facing surface of the support strip in direct contact with an inward-facing surface of the outer skin layer.

In some embodiments, a portion of the outward-facing surface of the compressible layer may be in direct contact with a portion of the inward-facing surface of the outer skin layer.

In some embodiments, an outward-facing surface of the compressible layer may be substantially flush with the outward-facing surface of the support strip.

In some embodiments, the support strip may be received in a recess formed in the compressible layer.

In some embodiments, forming the compressible layer may include molding the compressible layer around at least a portion of the support strip.

In some embodiments, providing the support strip between the outer skin layer and the compressible layer may include providing the support strip underneath a seam in the outer skin layer.

In some embodiments, stitching the thread may include forming a plurality of stitches that extend substantially parallel to each other.

In some embodiments, the method may include stitching another thread through the outer skin, the support strip, and the compressible layer to form another plurality of stitches extending substantially parallel to a seam in the outer skin layer.

In some embodiments, the seam may be a faux seam or a real seam.

In some embodiments, the interior component may include an instrument panel.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
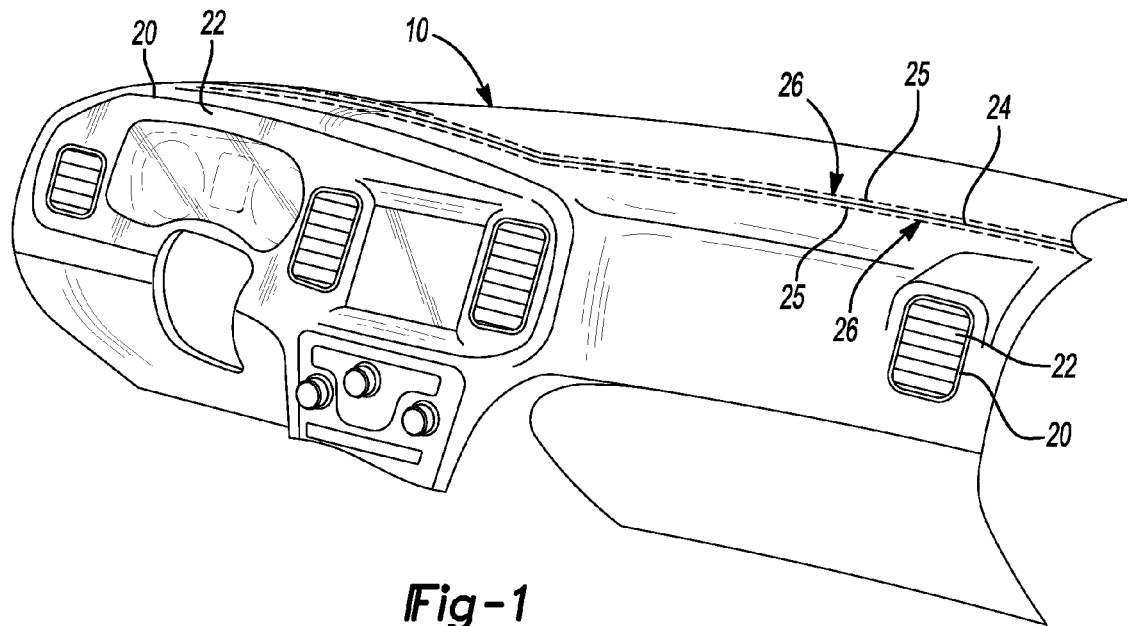
FIG. 1 is a perspective view of an instrument panel for a vehicle according to the principles of the present disclosure.
Figure 2:
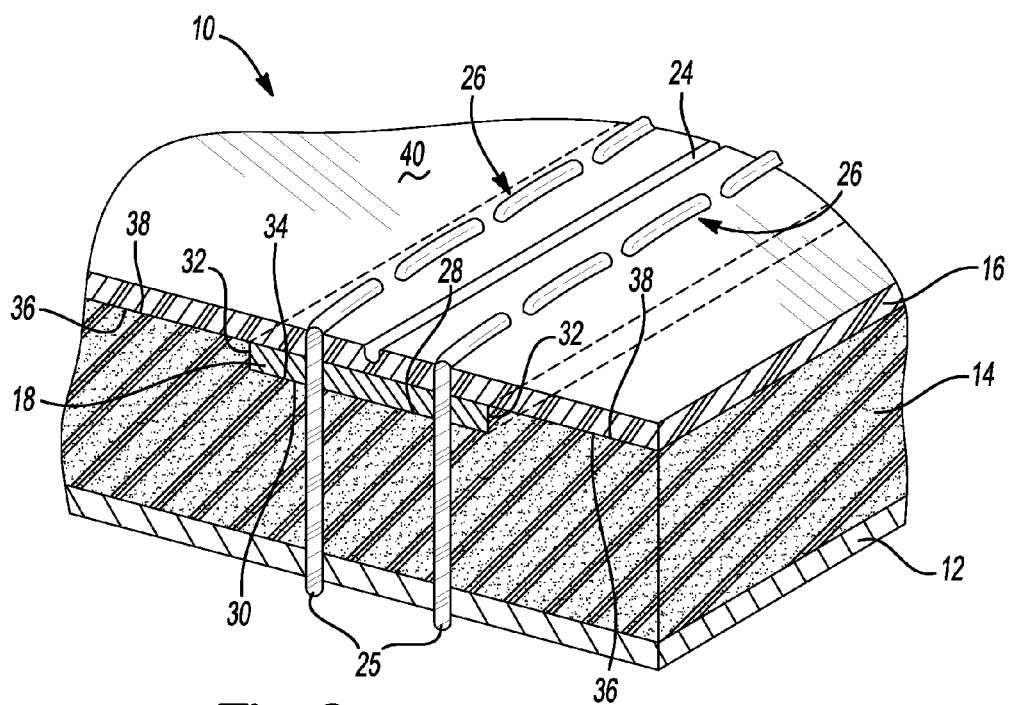
FIG. 2 is a partial cross-sectional view of the instrument panel of FIG. 1.
Figure 3:
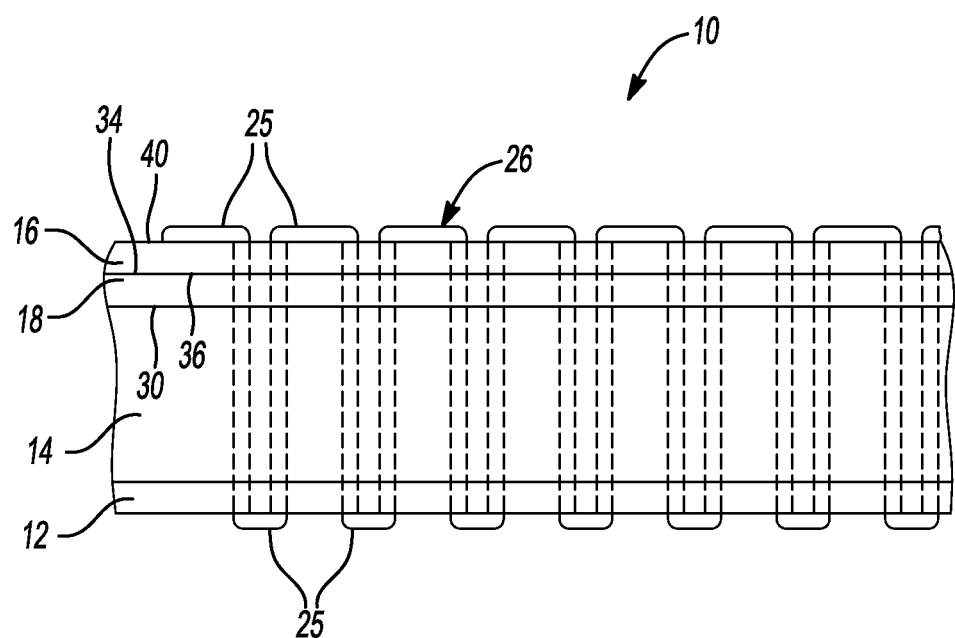
FIG. 3 is a side view of a portion of the instrument panel.

In an exemplary embodiment and with reference to FIGS. 1-3, an interior component 10 for a vehicle is provided that may include a base substrate layer 12, an intermediate layer 14, an outer skin layer 16 and one or more elongated support strips 18. As will be subsequently described, the one or more support strips 18 may support the outer skin layer 16 and reduce or prevent movement of the outer skin layer 16 during a stitching procedure.

The base substrate layer 12, intermediate layer 14 and/or outer skin layer 16 can be molded or otherwise formed in any desired shape or configuration. For example, in the embodiment depicted in FIG. 1, the interior component 10 may be an instrument panel and/or dashboard including openings 20 through which interior accessories 22 (e.g., gauges, stereo accessories, vents, display devices and/or vehicle control devices) may extend.

In some embodiments, the base substrate layer 12 may be a relatively rigid and/or relatively incompressible member and may be formed from a polymeric material such as polypropylene, thermoplastic Polyolefin (TPO), glass-filled polypropylene, and/or glass-filled TPO, for example. The intermediate layer 14 may be a resiliently compressible foam layer formed over the base substrate layer 12. For example, the intermediate layer 14 may be formed from a polyurethane material, for example.

The outer skin layer 16 can be a decorative layer including leather, vinyl and/or any other polymeric or upholstery material, for example. The outer skin layer 16 may be wrapped at least partially around the intermediate layer 14 and the base substrate layer 12. The outer skin layer 16 may include one or more seams 24. The seams 24 can be faux seams or real seams. In some configurations, one or more threads 25 may form one or more series of stitches 26 that extend substantially parallel to each seam 24.

The support strip 18 may be a relatively incompressible and/or rigid member formed from a polymeric material such as nylon or polypropylene, for example. As shown in FIG. 2, the support strip 18 may be disposed within a recess 28 in the intermediate layer 14 so that an inward-facing surface 30 of the support strip 18 and opposing lateral surfaces 32 of the support strip 18 engage corresponding surfaces of the recess 28. An outward-facing surface 34 of the support strip 18 may directly contact an inward-facing surface 36 of the outer skin layer 16. Outward-facing surfaces 38 of the intermediate layer 14 surrounding the recess 28 may be substantially flush with the outward-facing surface 34 of the support strip 18. In some embodiments, the intermediate layer 14 may be molded around the support strip 18 to embed the support strip 18 therein.

As shown in FIGS. 2 and 3, the threads 25 may be stitched through the outer skin layer 16, the support strip 18, the intermediate layer 14 and the base substrate layer 12. The support strip 18 may provide rigidity and support for the outer skin layer 16 and intermediate layer 14 that may prevent or reduce compression of the intermediate and outer skin layers 14, 16 toward the base substrate layer 12 while the threads 25 are being inserted therethrough during the stitching process. Reducing or preventing compression of the intermediate and outer skin layers 14, 16 during the stitching process may reduce or prevent "pillowing" of the intermediate and outer skin layers 14, 16. As used herein, the term "pillowing" refers to a condition whereby a material through which thread is stitched becomes fixed in a compressed condition by the thread (i.e., the material is initially compressed when the needle and thread are initially driven through the material and subsequently fixed in the compressed state by the stitches). By reducing or preventing pillowing, the outward-facing surface 40 of the outer skin layer 16 can be maintained in a substantially flat and uniform condition, as shown in FIG. 2. Reducing or preventing compression of the intermediate and outer skin layers 14, 16 during the stitching process may also reduce or prevent elongation of holes in the outer skin layer 16 through which the needle and threads 25 pass.

It will be appreciated that a single support strip 18 can span the entire length of the seam 24 or a plurality of support strips 18 can be arranged end-to-end to span the length of the seam 24. In some embodiments, the one or more support strips 18 may span only a portion of the length of the seam 24.

While the interior component 10 is described above and shown in the figures as including an instrument panel and dashboard, it will be appreciated that the interior component 10 could be any other interior component of the vehicle having stitching such as a seat, an armrest, a headrest, a headliner, or an interior door panel, for example.

What is claimed is:

1. A component for an interior of a vehicle comprising:
an inner layer;
an outer layer covering the inner layer;
an intermediate layer disposed between the inner and outer layers and formed from a resiliently compressible material;
a support strip at least partially received in a recess in the intermediate layer and having an inward-facing surface and an outward-facing surface, the outward facing surface being adjacent an inward-facing surface of the outer layer; and
a first thread stitched through the outer layer, the support strip, and the intermediate layer.

2. The component of claim 1, further comprising a second thread stitched through the outer layer, the support strip, and the intermediate layer, the first and second threads forming first and second series of stitches, respectively, that extend substantially parallel to each other.

3. The component of claim 1, wherein the support strip includes opposing lateral surfaces extending between the inward-facing and outward-facing surfaces of the support strip, the lateral surfaces being engaged with corresponding surfaces of the recess.

4. The component of claim 1, wherein the intermediate layer is molded around the support strip.

5. The component of claim 1, wherein the outward-facing surface of the support strip directly contacts and supports a portion of the inward-facing surface of the outer layer.

6. The component of claim 5, wherein a portion of the intermediate layer directly contacts the inward-facing surface of the outer layer.

7. The component of claim 1, wherein an outward-facing surface of the intermediate layer is substantially flush with the outward-facing surface of the support strip.

8. The component of claim 1, wherein the support strip is disposed beneath a seam in the outer layer.

9. The component of claim 8, wherein the seam includes a faux seam.

10. The component of claim 1, wherein the first thread is stitched through the inner layer.

11. A method of manufacturing an interior component of a vehicle, the method comprising:
forming a base layer;

forming an resiliently compressible layer over the base layer;

providing an outer skin layer over the compressible layer and the base layer, the outer skin layer being visible by an occupant of the vehicle when the interior component is installed in the vehicle;

providing a support strip between the outer skin layer and the compressible layer, the support strip being received in a recess formed in the compressible layer; and stitching a thread through the outer skin, the support strip, and the compressible layer.

12. The method of claim 11, wherein providing the support strip between the outer skin layer and the compressible layer includes providing an inward-facing surface of the support strip between an outward-facing surface of the compressible layer and the base layer.

13. The method of claim 12, wherein providing the support strip between the outer skin layer and the compressible layer includes providing an outward-facing surface of the support strip in direct contact with an inward-facing surface of the outer skin layer.

14. The method of claim 13, wherein a portion of the outward facing surface of the compressible layer is in direct contact with a portion of the inward-facing surface of the outer skin layer.

15. The method of claim 14, wherein an outward-facing surface of the compressible layer is substantially flush with the outward-facing surface of the support strip.

16. The method of claim 11, wherein forming the compressible layer includes molding the compressible layer around at least a portion of the support strip.

17. The method of claim 11, wherein providing the support strip between the outer skin layer and the compressible layer includes providing the support strip underneath a seam in the outer skin layer.

18. The method of claim 17, wherein stitching the thread includes forming a plurality of stitches that extend substantially parallel to the seam in the outer skin layer.

19. The method of claim 18, further comprising stitching another thread through the outer skin layer, the support strip, the compressible layer and the base layer to form another plurality of stitches extending substantially parallel to the seam.

* * * * *